United States Patent
Paternoster et al.

(10) Patent No.: US 9,951,502 B2
(45) Date of Patent: Apr. 24, 2018

(54) BASIN MOULDING, FOR EXAMPLE A KITCHEN SINK, A WASHBASIN OR THE LIKE, AND METHOD FOR PRODUCING SUCH A BASIN MOULDING

(71) Applicant: SCHOCK GMBH, Regen (DE)

(72) Inventors: Rudolf Paternoster, Rinchnach (DE); Xaver Pledl, Zwiesel (DE)

(73) Assignee: SCHOCK GMBH, Regen (DE)

( * ) Notice: Subject to any disclaimer, the term of this patent is extended or adjusted under 35 U.S.C. 154(b) by 95 days.

(21) Appl. No.: 14/907,933

(22) PCT Filed: Jul. 24, 2014

(86) PCT No.: PCT/EP2014/002024
§ 371 (c)(1),
(2) Date: Jan. 27, 2016

(87) PCT Pub. No.: WO2015/014462
PCT Pub. Date: Feb. 5, 2015

(65) Prior Publication Data
US 2016/0186417 A1    Jun. 30, 2016

(30) Foreign Application Priority Data
Jul. 29, 2013  (DE) .................. 10 2013 012 867

(51) Int. Cl.
*A47K 1/04* (2006.01)
*E03C 1/18* (2006.01)
(Continued)

(52) U.S. Cl.
CPC .............. *E03C 1/18* (2013.01); *A47L 19/02* (2013.01); *B29C 70/541* (2013.01); *B29K 2105/105* (2013.01)

(58) Field of Classification Search
CPC .................... E03C 1/18; B29C 70/541
(Continued)

(56) References Cited

U.S. PATENT DOCUMENTS

| | | | |
|---|---|---|---|
| 4,126,719 A * | 11/1978 | Koyanagi | B29C 70/00 156/245 |
| 4,427,482 A | 1/1984 | Yamada et al. | |

(Continued)

FOREIGN PATENT DOCUMENTS

| | | |
|---|---|---|
| DE | 37 42 833 | 7/1989 |
| DE | 197 14 399 | 10/1998 |

(Continued)

OTHER PUBLICATIONS

International Search Report (ISR) dated Oct. 6, 2014 in International (PCT) Application No. PCT/EP2014/002024.

*Primary Examiner* — Huyen Le
(74) *Attorney, Agent, or Firm* — Wenderoth, Lind & Ponack, L.L.P.

(57) ABSTRACT

A basin molding (1), for example a kitchen sink, a washbasin or the like, is made of a composite material having a polymerized cured binder (14) and fillers (16). The basin molding (1) has a visible side (34) and a rear side (36), which is located opposite the visible side (34). Unidirectionally oriented fibers (10) are polymerized into the composite material on, or in the vicinity of, the surface of the rear side (36) of the basin molding (1). A method produces such basin molding (1).

22 Claims, 2 Drawing Sheets

(51) Int. Cl.
　　　*A47L 19/02*　　　(2006.01)
　　　*B29C 70/54*　　　(2006.01)
　　　*B29K 105/10*　　(2006.01)

(58) Field of Classification Search
　　　USPC ........................................................... 4/619
　　　See application file for complete search history.

(56)　　　　　　　References Cited

U.S. PATENT DOCUMENTS

| 6,177,179 | B1 | 1/2001 | Schock et al. |
| 9,469,745 | B2 * | 10/2016 | Schibur ............... A47K 1/04 |
| 2010/0068518 | A1 | 3/2010 | Honma et al. |

FOREIGN PATENT DOCUMENTS

| DE | 20 2006 008 913 | 10/2007 |
| DE | 20 2012 102 782 | 1/2013 |
| EP | 0 016 248 | 10/1980 |
| EP | 0 693 503 | 1/1996 |
| EP | 2 138 530 | 12/2009 |
| JP | 2012-40763 | 3/2012 |
| WO | 97/10945 | 3/1997 |

* cited by examiner

_US 9,951,502 B2_

BASIN MOULDING, FOR EXAMPLE A KITCHEN SINK, A WASHBASIN OR THE LIKE, AND METHOD FOR PRODUCING SUCH A BASIN MOULDING

FIELD OF THE INVENTION

The invention relates to a basin molding, for example a kitchen sink, a washbasin, or the like, as well as a method for producing such a basin molding.

BACKGROUND OF THE INVENTION

DE 10 2004 055 365 A1 discloses a basin molding made of a composite material comprising a polymerized cured binder and fillers. EP 0 361 101 B1 discloses an associated production method using a molding suitable for kitchen sinks, for example. Basin moldings thus produced have a high optical quality as well as very good functional characteristics, in particular high abrasion resistance and high long-term stability of the visual appearance. By using suitable binders and fillers incorporated therein for the composite material, the appearance of, for instance, natural stone can be duplicated in high quality, while simultaneously improving the functional characteristics of the basin molding.

In particular, basin moldings that have large volumes and/or that deviate from a planar form and extend three dimensionally, such as a kitchen sink, have a weight in excess of 10 kg, for example. In particular during transport but also during installation of the basin moldings, measures must therefore be taken to prevent breakage, which requires a corresponding amount of effort and makes handling difficult.

SUMMARY OF THE INVENTION

The problem addressed by the invention involves providing a basin molding as well as a method for producing it, by which the breakage resistance of the basin moldings is improved, particularly during transport and/or installation, and the effort involved is reduced.

The problem is solved by the basin molding of the invention, as well as by the production method of the invention.

A relatively simple option for increasing the breakage resistance involves reducing the mass fraction of the fillers incorporated in the cured binder, via which the weight of the basin moldings could be reduced on the one hand and the basin molding would have a greater elasticity on the other hand. However, doing so would diminish the functional characteristics of the basin molding. Hence this option is not an ideal solution to the problem.

DE 10 2009 025 225 A1 proposes improving the resistance to impact and shock stresses due to the relative brittleness of the composite material caused by the high filler content by adding keratin fibers. For achieving an improvement, it is essential that the fibers are evenly distributed in the molding and have a maximum length of 10 mm.

In contrast, the present invention solves the problem by a basin molding, for example a kitchen sink, a washbasin, or the like, which is produced from a composite material comprising a polymerized cured binder and fillers incorporated therein. The basin molding has a visible side and a rear side located opposite the visible side. Unidirectionally oriented fibers are polymerized into the composite material on or in the vicinity of the surface of the rear side of the basin molding.

Unidirectional orientation of the fibers means that the corresponding fibers, at least in portions, are essentially oriented in a prespecified direction. The fibers can also have several, in particular two or even three portions in which they are oriented in different directions, for example because they follow the contour of the basin molding, which can have one or two basins, for example. In this case, the unidirectionally oriented fibers can be L-shaped (with one basin) or U-shaped (with two basins) overall. Alternatively, the unidirectionally oriented fibers can also be essentially straight over their entire length, also in the area of the basins or basin, for example. On the outside past the basin edge, for example, the fibers are polymerized on an edge of the basin molding surrounding the basin.

The straight portion of the unidirectionally oriented fibers can be more than 50 mm, in particular more than 100 mm, and preferably more than 150 mm long. For example, the unidirectionally oriented fibers can be oriented parallel, at least in portions, to a long side of the basin molding. The unidirectionally oriented fibers are arranged extending parallel to one another. In conjunction with the polymerization of the fibers into the composite material, in particular during the production of the basin molding, a considerable improvement in breakage resistance is achieved with less additional effort.

The fibers thus have a comparatively long length and are formed as, for example, fiber bundles or rovings of filaments or endless fibers. The polymerized fibers have a length greater than 10 cm, in particular greater than 20 cm, for example.

The fibers can be arranged in the basin molding in the vicinity of the surface of the rear side of the basin molding, but distant from the surface of the rear side. The fibers can in particular be covered with a layer of polymerized binder.

The unidirectionally oriented fibers, which serve as reinforcement fibers, can be composed of an inorganic material. In particular, they can be glass fibers, for example E-glass fibers. As an alternative or in addition, fibers made of other materials such as polymer plastics, carbon, or graphite can also be used, optionally in combination with one another and/or together with glass fibers. When considered over the entire basin molding, the unidirectionally oriented fibers are arranged in a highly inhomogeneous manner in the basin molding. In particular, the unidirectionally oriented fibers on or in the vicinity of the surface of the rear side of the basin molding are arranged in less than 5% of the volume of the basin molding, preferably in less than 3% of the volume of the basin molding.

The polymerization of the unidirectionally oriented fibers can take place during the curing of the binder, i.e., during the production of the basin molding. Studies have shown that such a polymerization during the process of producing the basin molding gives rise to a higher breakage resistance than does a subsequent lamination of unidirectionally oriented fibers onto the surface of the basin molding.

Another positive effect of the unidirectionally oriented fibers polymerized on or in the vicinity of the surface of the rear side of the basin molding lies in the fact that a curvature of the basin moldings due to the fibers polymerized on the rear side can be nearly completely compensated. An enrichment of the fillers of the composite material on the visible side of the basin molding, which is effected to improve the functional characteristics of the basin molding, can give rise to such a curvature. As a rule, the enrichment of the fillers on the visible side leads to a convex bulging of the visible side, especially in the draining board portion of a kitchen sink, for example. Even though this bulging can be compensated for during the installation of the basin molding, for example during the installation of a kitchen sink in a worktop, it is in principle undesirable. This convex bulging can be reduced or even completely compensated for by polymerizing the unidirectionally oriented and preferably comparatively long fibers on the rear side.

The proportion of binder is between 10 and 45 wt %, in particular between 15 and 40 wt %, and preferably between 20 and 35 wt %, in each case based on the sum of the mass of the binder, the fillers, and various amendments such as crosslinking agents, peroxides, or separating agents. The binder comprises at least one monomer and at least one polymer. In particular styrene, acrylic acid, or methacrylic acid or esters thereof can be used as monomers. In a special embodiment, the binder comprises a mixture of methyl methacrylate and polymethyl methacrylate. The polymethyl methacrylate can be a copolymer with the components ethyl methacrylate, butyl methacrylate, or the like.

The ratio of the weight proportions of polymer to monomer in the binder is between 1:1 and 1:10, in particular between 1:2 and 1:7, and preferably between 1:3 and 1:5. In particular, the particle sizes of the filler particles used and the required proportion of binder are in principle interdependent, such that an increase in the proportion of coarser filler particles tends to enable the proportion of binder to be reduced.

The proportion of preferably particulate and/or inorganic filler can be between 55 and 85 wt %, in particular between 60 and 80 wt %, and preferably between 65 and 75 wt %, in each case based on the total mass of binder, fillers, and amendments. The filler is preferably an inorganic mineral filler, in particular a crystalline filler such as quartz sand.

The filler preferably has a Mohs hardness of greater than 5, in particular greater than 6, and preferably around 7. This likewise applies to the greater proportion of the filler particles used. For technical as well as economic reasons, preference is given to the use of silicon dioxide with a Mohs hardness of ca. 7. As an alternative or in addition, other and in particular even harder filler particles that can be obtained naturally or produced synthetically can also be used.

In an embodiment of the invention, with the exception of fibers on or in the vicinity of the surface of the rear side of the basin molding, the composite material is free of unidirectionally oriented fibers or even completely free of fibers of any kind. In particular the composite material formulations developed thus far can be used in unaltered form for basin moldings of the invention as well.

In an embodiment, more than 50 wt %, in particular more than 70 wt %, and preferably even more than 80 wt % of the fibers polymerized on or in the vicinity of the surface of the rear side of the basin molding are unidirectionally oriented, at least in portions, in a first direction. This proportion of the fibers can be oriented, at least in portions, parallel to a long edge of the basin molding.

More than 80%, in particular more than 90%, or even essentially all other fibers preferably run diagonally and in particular transversely to the first direction. Hence these other fibers can also be unidirectionally oriented.

The unidirectionally oriented fibers on or in the vicinity of the surface of the rear side of the basin molding can be polymerized into the composite material in the form of a fiber fabric, a fiber mat, or a fiber mesh. In the case of a fabric, the warp fibers, for example, can outnumber the weft fibers and be oriented unidirectionally, at least in portions, in the first direction. For example, the warp of such a fiber fabric can be formed by a greater number of fibers or fiber bundles or rovings per cm than the weft. As an alternative or in addition, the fiber weight of the warp can be many times greater than the fiber weight of the weft, and/or the material of the warp fiber can, for example, be formed by an inorganic glass such as a E-glass, whereas the weft fibers can be formed from an organic material such as a polyester.

In an embodiment, the fibers unidirectionally oriented on or in the vicinity of the surface of the rear side of the basin molding and polymerized into the composite material are arranged on less than 30% of the area of the rear side of the basin molding, in particular on less than 20% and preferably on less than 10% of the area of the rear side of the basin molding. Thus, the reinforcement fibers can be used specifically only where doing so is particularly effective for achieving the desired objective, in particular the increasing of the breakage resistance, but also the compensation of a curvature of the basin molding.

In an embodiment, the unidirectionally oriented fibers on or in the vicinity of the surface of the rear side of the basin molding are polymerized into the composite material in the form of at least one strip.

Two strips that preferably extend in the vicinity of the long edges of the basin molding or several strips that are preferably oriented parallel to one another can be polymerized. As an alternative or in addition to a strip, the unidirectionally oriented fibers can also be polymerized in the form of at least one patch, with a rectangular, square, polygonal, or, at least in portions, curved perimeter.

The length:width ratio of the strip can be greater than 3:1, in particular greater than 5:1, and preferably greater than 7:1. The length of the strips can be greater than 150 mm, in particular greater than 200 mm and preferably greater than 250 mm. The width of the strips can be greater than 15 mm, in particular greater than 20 mm and preferably greater than 25 mm. The thickness of the strips can be less than 1.2 mm, in particular less than 0.9 mm, and preferably less than 0.6 mm. The desired effect is thus achievable with a relatively small-scale material use of the fibers.

In an embodiment, the fibers unidirectionally oriented on or in the vicinity of the surface of the rear side of the basin molding and polymerized into the composite material extend in the portion of a wall of a basin of the basin molding, as well as in another portion of the basin molding adjoining the basin. Hence, the fibers in each case extend, preferably without interruptions, unidirectionally and parallel to one another in two or more portions. The orientation is different in the different portions. A particularly effective stabilization of the basin molding, and thus an increase in breakage resistance, is achieved by the extension of the oriented fibers in the wall portion of the basin as well as in the other portion adjoining the basin. Fibers are preferably polymerized in a suitable manner in the form of two or more strips running parallel to one another and spaced apart from one another.

In an embodiment, the distance of the fibers unidirectionally oriented on or in the vicinity of the surface of the rear side of the basin molding and polymerized into the composite material from the surface of the rear side of the basin molding is less than 40%, in particular less than 30%, and preferably less than 20% of the thickness of the basin molding in the portion comprising the fibers. In a basin molding with a thickness between 7 and 12 mm, for example, the distance can be less than 4 mm, in particular less than 3 mm, and preferably less than 2 mm. The stabilization by the fibers is thus effected at a particularly suitable position within the basin molding.

In an embodiment, the mass fraction of the fibers unidirectionally oriented on or in the vicinity of the surface of the rear side of the basin molding and polymerized into the composite material is less than 1.2%, in particular less than 0.6%, and preferably less than 0.2% of the total mass of the basin molding. For example, studies have shown that a greater than 50% increase in breakage resistance is achievable, even if the corresponding fibers make up only 0.05% to 0.09% of the total mass of the basin molding.

The invention also relates to a method for producing a basin molding such as a kitchen sink, a washbasin, or the like from a composite material comprising a polymerized binder and fillers incorporated therein. The basin molding has a visible side and a rear side which is located opposite the visible side. Unidirectionally oriented fibers are polymerized, at least in portions, into the composite material on or in the vicinity of the surface of the rear side of the basin molding by the method. In this process, the polymerization preferably occurs during the curing of the binder for producing the basin molding.

In an embodiment, the basin molding is produced by casting a mold part, in particular by casting molds, for example by filling a cavity delimited by one or more mold parts with the still liquid binder comprising the particulate fillers. The filling of the mold part, especially when pressure is applied to at least one of the mold parts, leads to a saturation or impregnation of the unidirectionally oriented fibers introduced into the mold part as fabric strips, for example.

In an embodiment, the fibers are arranged on the mold part before the filling of the mold part with the binder containing the particulate fillers and saturated with the binder before the polymerization of the binder. The fibers are arranged, for example, on a mold part portion that forms the rear side of the basin molding. The fibers can have a distance to the mold part portion such that they will be spaced at a distance from the rear-side surface of the finished basin molding and in particular covered by a layer of polymerized binder.

The arrangement of the fibers on the mold part can be effected with, for example, a fastener, which at least partially dissolves during the polymerization of the binder. The fastening can be effected by, for example, an adhesive strip in which the adhesive layer can dissolve during the polymerization of the binder. The fastening of the fibers onto the mold part is preferably effected only in portions rather than over the entire surface, thus improving the saturation of the fibers with the still liquid binder.

Each of the features mentioned can be essential to the invention alone or in any combination.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
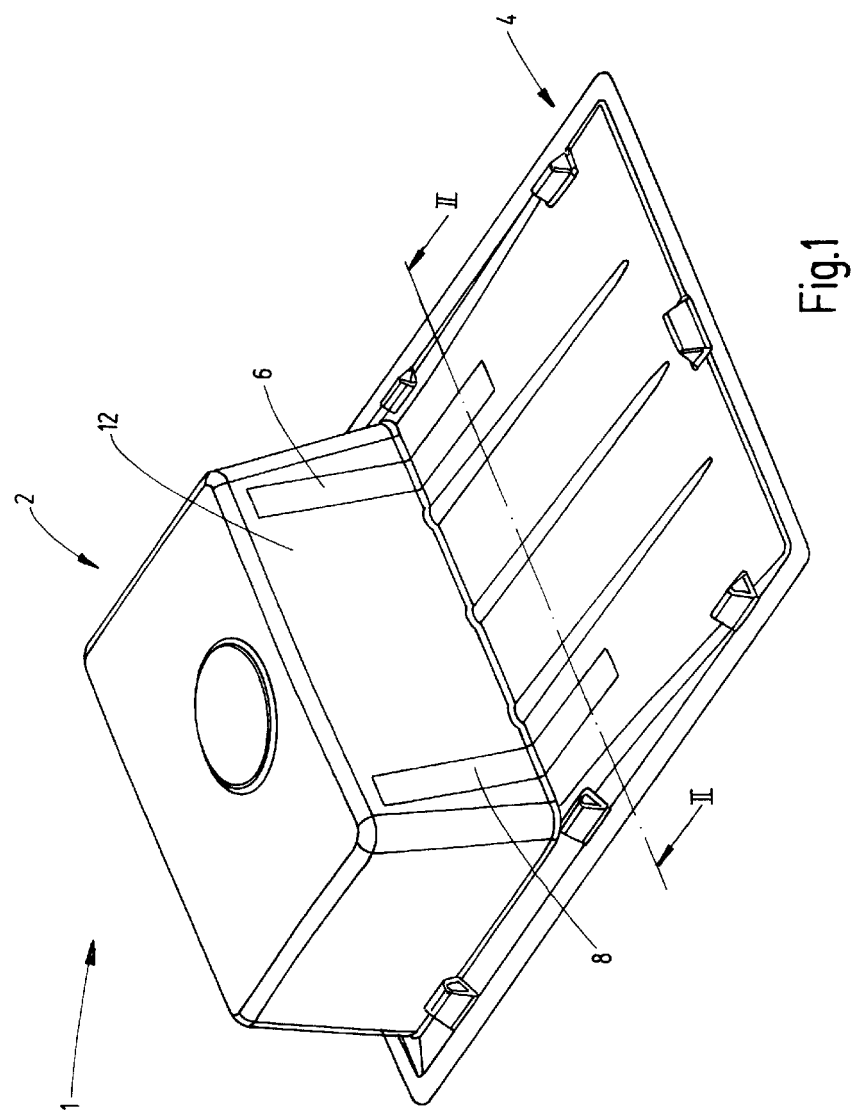
FIG. 1 is a perspective view of the rear side of a basin molding according to an exemplary embodiment of the invention.

FIG. 1 shows a perspective view of the rear side of a basin molding according to the invention, which in this case is a kitchen sink.

The basin molding 1 comprises a portion with a basin 2 as well as another, adjoining portion 4 that forms a draining board on the visible side not illustrated in FIG. 1 of the basin molding 1. The basin molding 1 is produced from a composite material, which in the still unpolymerized liquid state comprises a binder solution of polymethyl methacrylate in methyl methacrylate with a proportion of 22 to 32 wt % based on the total curable mass. The proportion of polymethyl methacrylate in this binder solution is between 18 and 25 wt %. Along with some amendments or additives such as a peroxide catalyst, a bonding agent, and/or a crosslinking agent, an additional 67 to 78 wt % of preferably inorganic particulate fillers, for example, crystalline quartz sand, are incorporated in this binder solution. 70 to 85 wt % of the fillers, for example, can have a size of between 0.1 mm and 0.4 mm.

In an alternative embodiment, the proportion of fillers can be between 67 and 70 wt %, and the particle size of a filler formed from, for example, quartz sand can, in any case for more than 90 wt % of the filler particles, be between 0.05 mm and 0.3 mm. The proportion of the crosslinking agent can be greater than 20 wt % and less than 32 wt % based on the mass fraction of the monomer in the binder solution, which can be between 70 wt % and 80 wt %, for example.

In the illustrated exemplary embodiment, unidirectionally oriented fibers 10 (FIG. 3) in the form of two fabric strips 6, 8 are arranged just beneath the surface of the rear side 36 of the basin molding 1. Both fabric strips 6, 8 are formed from a unidirectional glass fiber fabric with a width of ca. 30 mm and an overall length of ca. 300 mm, for a thickness of ca. 0.4 mm. The weight per unit area is ca. 450 g/m². The warp running in the longitudinal direction of the fabric strips 6, 8 and formed by the unidirectionally oriented fibers 10 is formed in the exemplary embodiment by four fiber bundles or rovings per cm with a fiber weight of 1,200 tex (1,200 g per 1,000 m). The warp fibers are produced from an E-glass. The weft 26 running transversely to the longitudinal direction of the fabric strips 6, 8 on the other hand is formed by 1.8 fibers per cm and has a fiber weight of 28 tex. The weft fibers 26 are produced from polyester, for example.

The fabric strips 6, 8 run parallel to one another in portions and are arranged at the transition of a side wall 12 of the basin 2 to the rear side of another portion 4 forming the draining board. The two fabric strips 6, 8 have a distance from one another that is greater than 60%, in particular greater than 70%, and preferably greater than 75% of the extension of the side wall 12 such that the two fabric strips 6, 8 are arranged in the vicinity of the outer edge of the side wall.

Figures 2, 3:
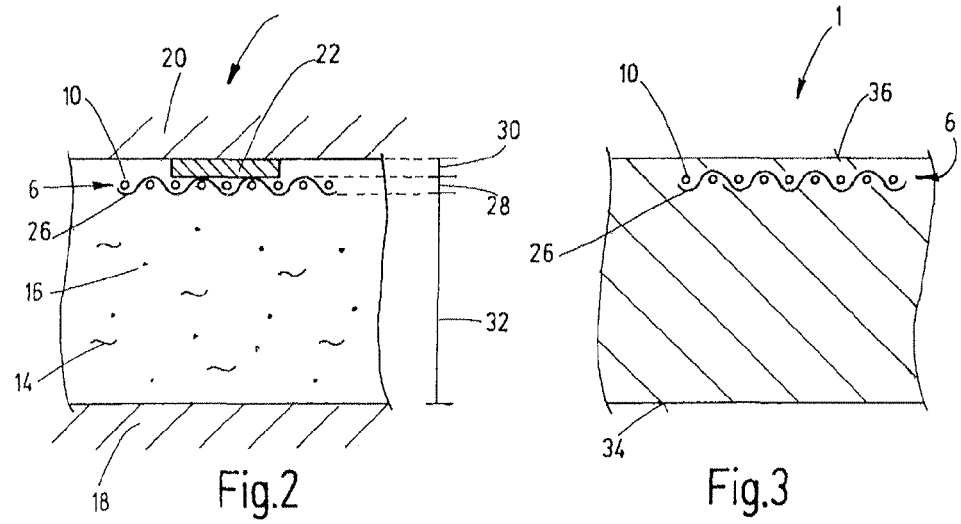
FIG. 2 is a side view in section taken along II-II through the basin molding 1 of FIG. 1 during the production process.
FIG. 3 is a side view in section taken along II-II through the basin molding 1 of FIG. 1 after the production process.

FIG. 2 shows a section along II-II through the other portion 4 of the basin molding 1 of FIG. 1 in the area of a fabric strip 6 during the production process and before the curing of the binder 14. The mold part comprises a bottom mold part 18, by which the visible side of the basin molding 1 is formed during casting, as well as a top mold part 20, by which the rear side of the basin molding 1 is formed during casting. Before the filling of the mold part with the binder 14, the fabric strip 6 is arranged on the top mold part 20 by an adhesive strip 22. The width of the adhesive strip 22 is less than 75%, in particular less than 60%, of the width of the fabric strip 6 such that the fabric strip 6 preferably juts out beyond the adhesive tape 22 on both sides, thereby improving the saturation of the fabric strip 6 with the binder 16 [sic].

The fabric strip 6 is formed by the warp fibers or warp rovings extending perpendicular to the drawing plane of FIG. 2, which also form the unidirectionally oriented fibers 10 according to the invention and which are produced from E-glass. The weft fibers 26, which for example are composed of a plastic such as polyester and whose fiber weight is less than 20%, in particular less than 10%, and preferably less than 5% of the fiber weight of the warp fibers, extend transversely to the warp fibers in the drawing plane of FIG. 2. The fiber weave of the fabric strip 6 is only shown schematically in FIG. 2. Other fiber weaves such as a multi-ply fabric or the use of a mat or a mesh in lieu of a fabric are also possible.

The thickness 28 of the fabric strip 6 in the exemplary embodiment is ca. 0.4 mm. The thickness 30 of the adhesive strip 22, for example, can be between 0.01 mm and 0.5 mm, in particular between 0.05 mm and 0.2 mm. On the other hand, the distance 32 of the fabric strip 6 from the bottom mold part 18 and hence from the visible side 34 of the basin molding 1 can be between 6 and 12 mm, for example.

FIG. 3 shows a detail of the basin molding 1 in the area of the fabric strip 6 after the curing of the binder 14. While the fabric strip 6 is arranged in the vicinity of the rear side 36 of the basin molding 1, it is covered with a layer of cured binder 14 up to the surface of the rear side 36.

Figure 4:
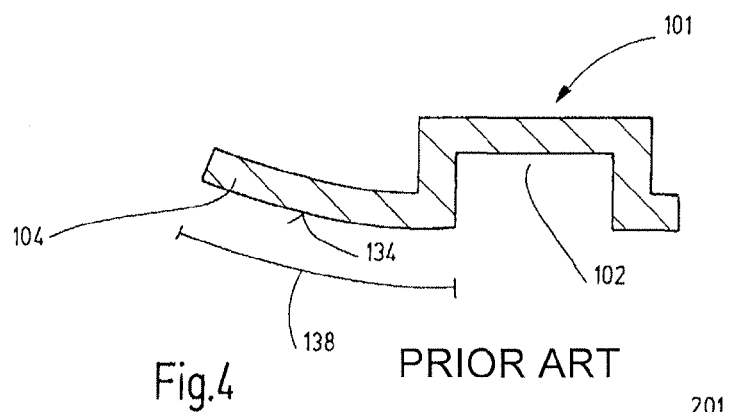
FIG. 4 is a schematic side view in section through a basin molding according to the prior art.

FIG. 4 shows a schematic longitudinal section through a basin molding 101, which is not equipped according to the present invention. In particular in the area of the other portion 104, and again in the area of the portion 138 at the transition of the other portion 104 to the basin 102, a curvature arises in the prior art basin moldings, which is arched convexly toward the visible side 134.

Figure 5:
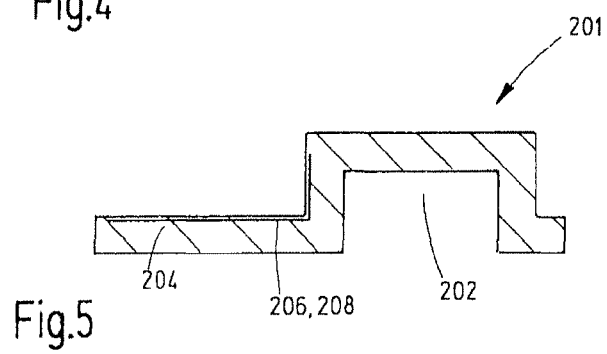
FIG. 5 is a schematic side view in section through a basin according to another exemplary embodiment of the invention.

FIG. 5 shows a schematic longitudinal section through another exemplary embodiment of a basin molding 201 according to the invention, which enables the production of essentially planarly oriented three-dimensional basin moldings 201 and simultaneously improves the breakage resistance of the moldings 201 thus produced owing to the fibers 10 that are unidirectionally oriented by the fabric strips 206, 208 polymerized essentially in an L-shape in the exemplary embodiment. In contrast to the exemplary embodiment of FIG. 1, in the basin molding 201 of FIG. 5 a shank of the polymerized fibers 10 extends over more than 40%, in particular more than 60%, and preferably more than 80% of the length of the other portion 204.

While various embodiments have been chosen to illustrate the invention, it will be understood by those skilled in the art that various changes and modifications can be made therein without departing from the scope of the invention as defined in the claims.

The invention claimed is:

1. A basin molding, comprising:
    a visible side;
    a rear side located opposite the visible side;
    a composite material including a polymerized, cured binder and fillers incorporated therein; and
    unidirectional fibers polymerized into the composite material in a vicinity of a surface of the rear side, the unidirectional fibers being arranged on less than 30 percent of a surface area of the surface of the rear side, the unidirectional fibers forming a fabric strip arranged in the vicinity of the rear side and covered by a layer of cured binder towards the surface of the rear side.

2. A basin molding according to claim 1 wherein the composite material is free of unidirectionally oriented fibers, except for the unidirectional fibers in the vicinity of a surface of the rear side.

3. A basin molding according to claim 1 wherein more than 50 percent by weight of the unidirectional fiber polymerized are unidirectionally oriented in a first direction.

4. A basin molding according to claim 1 wherein more than 70 percent by weight of the unidirectional fiber polymerized are unidirectionally oriented in a first direction.

5. A basin molding according to claim 1 wherein more than 80 percent by weight of the unidirectional fiber polymerized are unidirectionally oriented in a first direction.

6. A basin molding according to claim 1 wherein the unidirectional fibers are arranged on less than 20 percent of a surface area of the surface of the rear side.

7. A basin molding according to claim 1 wherein the unidirectional fibers are arranged on less than 10 percent of a surface area of the surface of the rear side.

8. A basin molding according to claim 1 wherein the strip has with a length to width ratio greater than 3:1.

9. A basin molding according to claim 1 wherein the strip has a length to width ratio greater than 5:1.

10. A basin molding according to claim 1 wherein the strip has a length to width ratio greater than 7:1.

11. A basin molding according to claim 1 wherein the unidirectional fibers extend in a first portion of a wall of a basin and in a second portion of the basin molding adjacent the basin.

12. A basin molding according to claim 1 wherein a distance of the unidirectional fiber from the surface of the rear side is less than 40 percent of a thickness of a portion of the basin molding containing the unidirectional fibers.

13. A basin molding according to claim 1 wherein a distance of the unidirectional fiber from the surface of the rear side is less than 30 percent of a thickness of a portion of the basin molding containing the unidirectional fibers.

14. A basin molding according to claim 1 wherein a distance of the unidirectional fiber from the surface of the rear side is less than 20 percent of a thickness of a portion of the basin molding containing the unidirectional fibers.

15. A basin molding according to claim 1 wherein the unidirectional fibers have a mass fraction of less than 1.2 percent of a total mass of the basin molding.

16. A basin molding according to claim 1 wherein the unidirectional fibers have a mass fraction of less than 0.6 percent of a total mass of the basin molding.

17. A basin molding according to claim 1 wherein the unidirectional fibers have a mass fraction of less than 0.2 percent of a total mass of the basin molding.

18. A basin molding according to claim 1 wherein the fabric strip is spaced from the surface of the rear side.

19. A method for producing a basin molding having a visible side and a rear side opposite the visible side, comprising the steps of:

providing a composite material including a polymerized binder and fillers therein; and polymerizing unidirectional fibers into the composite material close to a rear surface of the rear side of the basin molding.

20. A method according to claim 19 wherein the composite material and the unidirectional fiber are cast in casting molds.

21. A method according to claim 19 wherein the unidirectional fibers are arranged on a mold part and saturated with the binder before the polymerization of the binder and before filling of the mold part with the composite material, the fillers being particulate fillers.

22. A method according to claim 21 wherein the unidirectional fibers are polymerized into the composite material spaced from the rear surface.

* * * * *